(12) United States Patent
Wilhelm

(10) Patent No.: US 7,322,229 B2
(45) Date of Patent: Jan. 29, 2008

(54) DEVICE AND METHOD FOR MEASURING THE PROFILE OF A SURFACE

(75) Inventor: Justin W. Wilhelm, St. Paul, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 11/019,493

(22) Filed: Dec. 21, 2004

(65) Prior Publication Data
US 2005/0138995 A1   Jun. 30, 2005

Related U.S. Application Data

(60) Provisional application No. 60/532,492, filed on Dec. 24, 2003.

(51) Int. Cl.
  *B23Q 17/09*   (2006.01)
  *G01N 19/02*   (2006.01)
  *G01B 5/28*    (2006.01)

(52) U.S. Cl. ............ 73/104; 33/533; 33/DIG. 21; 33/707; 250/559.29

(58) Field of Classification Search ............. 33/533, 33/1 BB, 227, 228, DIG. 21, 188, 285, 707; 73/104, 105; 250/559.29, 559.3
See application file for complete search history.

(56) References Cited

U.S. PATENT DOCUMENTS

| | | | |
|---|---|---|---|
| 4,361,044 A * | 11/1982 | Kupperman et al. ......... 73/623 |
| 4,434,558 A | 3/1984 | Face et al. |
| 5,051,933 A * | 9/1991 | Sarr et al. .................... 702/167 |
| 5,392,527 A * | 2/1995 | Ziskovsky et al. ........... 33/542 |
| 5,617,645 A | 4/1997 | Wick et al. |
| 5,715,062 A * | 2/1998 | Ota ............................ 356/623 |
| 5,798,925 A | 8/1998 | Poling |
| 5,818,061 A * | 10/1998 | Stern et al. ............ 250/559.29 |
| 5,875,559 A * | 3/1999 | Birang et al. ................ 33/553 |
| 6,161,429 A * | 12/2000 | Marvel et al. ................ 73/146 |
| 6,169,290 B1 | 1/2001 | Rosberg et al. |
| 6,442,857 B1 * | 9/2002 | Atsuhiko et al. ............ 33/553 |
| 6,497,047 B1 | 12/2002 | Miyagawa et al. |
| 6,561,451 B1 * | 5/2003 | Steinich ................... 242/563.2 |
| 6,768,321 B2 * | 7/2004 | Wain et al. ................. 324/699 |

FOREIGN PATENT DOCUMENTS

GB   2 186 976 A   8/1987
JP   2001-033247   2/2001

* cited by examiner

*Primary Examiner*—Michael Cygan
(74) *Attorney, Agent, or Firm*—Eloise J. Maki

(57) ABSTRACT

The invention provides a surface profile measurement device for use on rigid or semi-rigid substrates, such as floors. The device includes (a) a beam; (b) at least one beam support mounted on the beam; (c) a sensor assembly slidably connected to said beam and adapted for measuring the distance to the surface; and (d) a transducer assembly adapted for measuring the position of said sensor assembly along said beam.

11 Claims, 2 Drawing Sheets

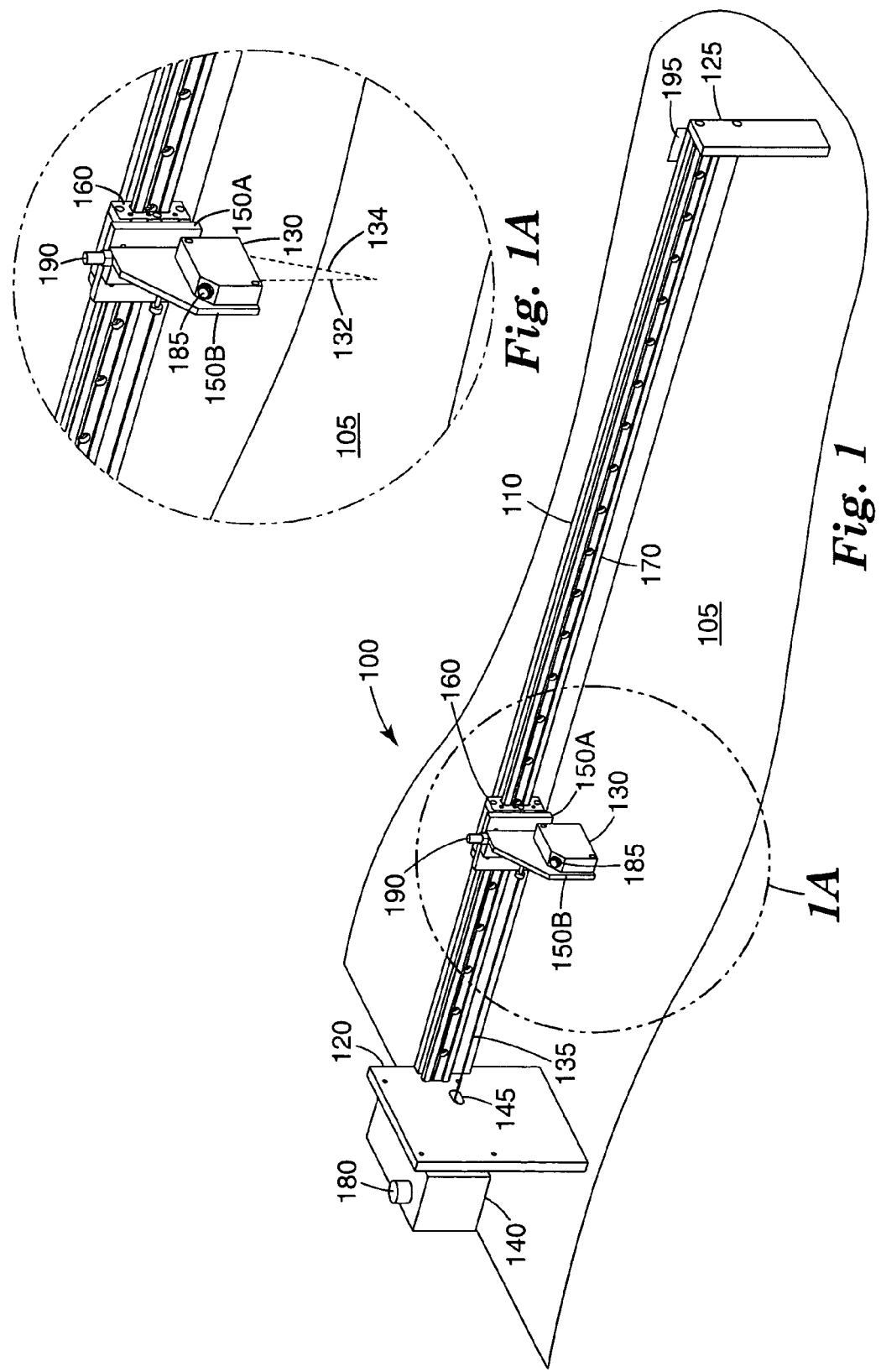

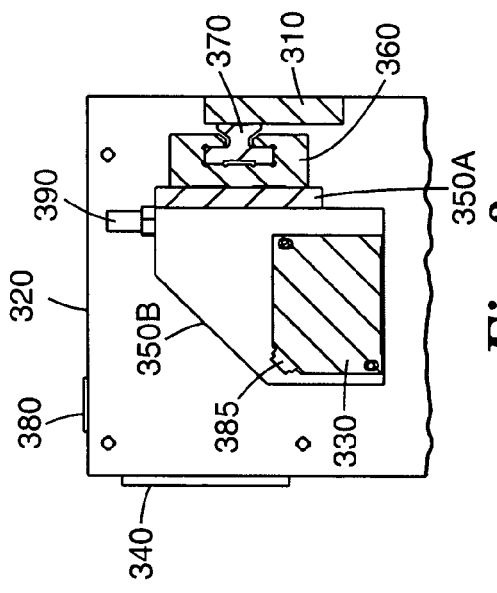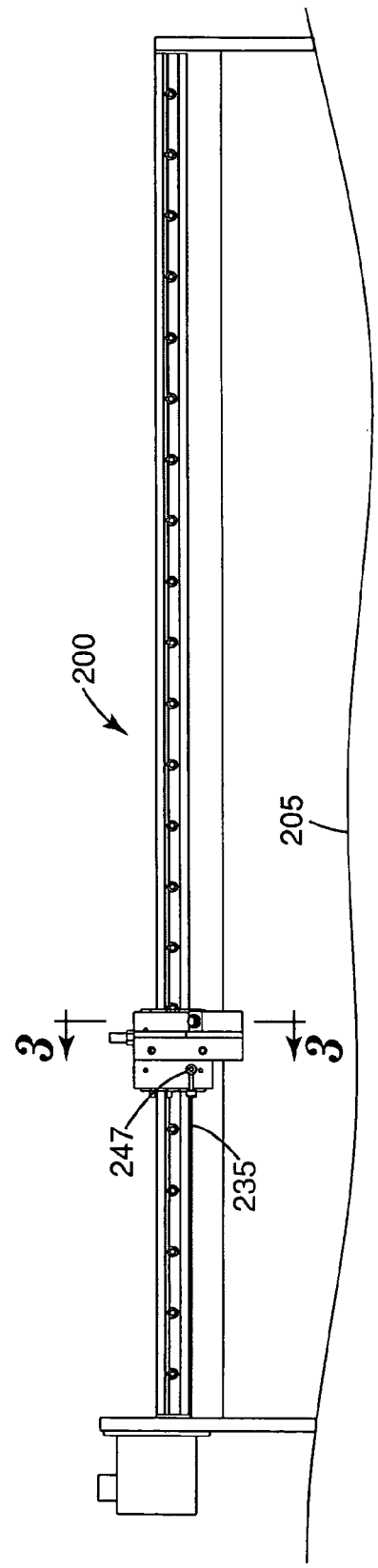

DEVICE AND METHOD FOR MEASURING THE PROFILE OF A SURFACE

CROSS REFERENCE TO RELATED APPLICATION

This application claims priority to U.S. Provisional Patent Application No. 60/532,492, filed Dec. 24, 2003.

FIELD OF THE INVENTION

The invention relates generally to surface profile measurement devices and more particularly to two-dimensional, non-contact mapping devices for use on rigid or semi-rigid substrates, such as floors.

BACKGROUND

The translation of a surface profile into a quantifiable record is commonly performed with either digital or analog devices that have one component that measures linear position parallel to the surface and another component that measures a relative distance normal to the surface. In the most simplistic method, a straight edged linear measurement device, such as a ruler, is laid on the surface and a second linear measurement device is used to quantify the normal distance from the straight edge to the surface. In most cases, the surface is contacted with the tip of a linear measurement device, positioned perpendicular to the general plane of the surface. In the case of a horizontal surface, the measurement device indicates the vertical position of the tip relative to its horizontal position along the surface. A record of the vertical position of the tip is made either by an attachment to the tip itself, such as a pen onto graph paper, electronically, such as data acquisition software in a computer, or manually by the operator of the device. Resolution of the recorded data is dependent upon the ability of the normal linear measurement device to maintain contact with the surface while maintaining orientation normal to the surface and the ability of the tip to fit into any crevices along the surface.

In measurement devices that use non-contact technology to determine the normal distance from its face to the surface, the relative horizontal placement is generally accomplished with sophisticated components such as rate gyroscopes. These devices are typically robotic in nature and self-propelled along the surface. For this type of device, resolution parallel to the surface relies on the accuracy of the transportation device. The functionality of this type of device is limited to horizontal surfaces. In addition, the complexity of this type of device translates to high cost.

SUMMARY

The present invention features a device for measuring the profile of a surface. The device includes (a) a beam; (b) at least one beam support mounted on the beam; (c) a sensor assembly slidably connected to the beam and adapted for measuring the distance to the surface; and (d) a transducer assembly adapted for measuring the position of said sensor assembly along said beam.

In various embodiments of the invention, the sensor assembly comprises a laser triangulation sensor and the transducer assembly comprises a cable, such as a spring loaded cable, attached to the sensor array.

In other embodiments, the device may further include a leveling apparatus and leveling means to aid in the positioning of the beam relative to the surface being measured.

The device may also include a motor or a carriage knob for laterally positioning the sensor assembly on the beam.

In yet another embodiment, the sensor assembly and/or the transducer assembly may be connected to a data acquisition apparatus, such as a portable computer, for storing and processing information.

In another aspect, the invention provides a method for measuring the profile of a surface, such as a floor, which method includes the following steps: (a) placing a sensor assembly at a first position along a beam; (b) measuring the distance from the sensor assembly to the surface at the first position; (c) measuring the lateral position of the sensor assembly on the beam at the first position; (d) placing the sensory assembly at a second position along a beam; (e) measuring the distance from the sensor assembly to the surface at the second position; and (f) measuring the lateral position of the sensor assembly on the beam at the second position. The pairs of collected measurements may then be transmitted to a data acquisition device for storage and/or processing. Using these measurements, a two dimensional profile of the surface can be created.

Other features and advantages of the present invention will be apparent from the following detailed description thereof, from the figures, and from the claims.

BRIEF DESCRIPTION OF THE DRAWINGS

FIG. 1 is a schematic diagram showing an oblique view of an exemplary device according to the invention.

FIG. 1A shows an expanded view of the interaction between the sensor assembly and the surface being measured.

FIG. 2 is a schematic diagram of an exemplary surface profiling device positioned over a surface to be measured.

FIG. 3 is a schematic diagram showing a cross-section of the exemplary device depicted in FIG. 1.

DETAILED DESCRIPTION

The present invention is directed generally to a device, referred to herein as a portable profilometer, which measures the profile of a non-moving surface by a non-contact method. In one embodiment, the profilometer comprises a beam supported by one or more beam supports on the surface to be measured. A sensor assembly disposed on the beam is able to traverse along a bearing track on the beam. The beam supports permit disposition of the beam and sensor assembly a certain distance away from and generally parallel to the surface. During traverse of the sensor assembly along the beam, the sensor assembly provides information to a data acquisition device regarding the distance of the surface from the sensor assembly. At the same time, a position transducer provides information to the data acquisition device regarding the lateral distance of the sensor assembly along the bearing track. As the sensor traverses the beam, an algorithm executed within the data acquisition system records a signal from the sensor at user-defined increments of the lateral distance as measured by the position transducer. Once the traverse is complete, the pairs of collected data points are stored by the algorithm and are used to define a two dimensional depiction of the surface profile along the chosen orientation.

The surface profilometer of the present invention can be used to determine the profile of surfaces on both a micro- and macro-scale. Surfaces that can be profiled using the device include countertops, walls, floors, and ceilings. Surface materials can include wood, concrete, plastic, glass, metal, and other rigid or semi-rigid materials. The inventive profilometer can be used to determine the general deviation of the surface from planarity, i.e., the contour profile or waviness of a surface. The profilometer can also be used to determine a macrostructure of the surface, such as, for example, the porosity of a poured concrete wall or the coarseness of an abrasive material. Furthermore, the profilometer of the present invention may be used to determine the topography of a micro-structured surface.

FIG. 1 depicts one embodiment of a surface profilometer according to the present invention. Profilometer 100 (shown as 200 in FIG. 2) comprises a beam 110 having a left beam support 120 near one end and a right beam support 125 near the opposite end. A sensor assembly 130 is attached to a bearing 160 by means of optional sensor supports 150A and 150B. The bearing 160 is in slidable contact with the bearing track 170 and can be caused to traverse along the bearing track by manual force exerted parallel to the beam 110 by means of the carriage knob 190. The lateral position of the sensor assembly 130 along the beam 110 is detected by a position transducer assembly 140 by means of the cable 135 attached at one end to the position transducer assembly 140 and at the other end to the sensor support 150B. In the embodiment shown in FIG. 1, the position transducer assembly 140 is mounted on one side of the left beam support 120 and the cable 135 passes through the cable aperture 145 disposed in the left beam support 120. When the profilometer is in use, information relating to the distance of the surface 105 (shown as 205 in FIG. 2) from the sensor 130 is relayed from the sensor 130 via the sensor output port 185 to a data acquisition device (not shown). Simultaneously, information relating to the lateral distance of the sensor assembly 130 along the beam 110 is relayed from the position transducer assembly 140 to the data acquisition device by means of the transducer output port 180.

The beam 110 may be constructed of any material and cross-sectional geometry which provides flex resistance during traverse of the sensor assembly 130 along the beam. Materials suitable for construction of the beam 110 include any materials with sufficient rigidity to resist deflection of a significant magnitude relative to the desire precision of the measurements. Suitable materials include metals, plastics, wood, and the like. Metals can include, but are not limited to, aluminum, steel, iron, copper, brass, and nickel. Aluminum is a particularly suitable metal because of its large strength to weight ratio. Suitable plastics include engineering materials such as nylon, polyolefins, and polyester. The cross-section of the beam 110 (shown as 310 in FIG. 3) can be any geometry including but not limited to rectangular, circular, ellipsoidal, and triangular.

The beam 110 is typically machined or otherwise formed in one piece. One-piece beam construction is considered to provide maximum stability and support to the bearing track 170 and to the sensor assembly 130. It is contemplated that for some applications the beam 110 and bearing track 170 can be hinged or otherwise adapted to being folded for convenience in storage or handling.

The beam 110 is supported adjacent one end by left beam support 120 and adjacent the other end by right beam support 125. The two beam supports can be made of any rigid material and can be of any suitable geometry. The function of the two beam supports is to suspend the beam over the surface to be measured. It is not required that the beam 110 be maintained in a horizontal position, and therefore, it is not required that left beam support 120 and right beam support 125 be adjustable, although they may be adjustable if so desired. For certain embodiments, it is envisioned that a leveling device 195 and leveling means could be attached to or built into the profilometer 100 to aid in positioning the beam generally parallel to the surface being measured. Such leveling means are particularly useful where the measured topology is relative to horizontal. An exemplary leveling device could be a bubble level. Exemplary leveling means could comprise one or more adjustable threaded screws attached to each beam support 120 and 125.

Where the surface to be measured is horizontal, such as a floor, the profilometer is generally held in place by gravity. Where the surface is a wall or other vertical surface, the beam supports may be equipped with a suction device or similar means for holding the profilometer onto the surface being measured.

Since the sensor assembly 130 traverses between the two beam supports, the distance between the left beam support 120 and the right beam support 125 determines the maximum length of the surface to be measured by the profilometer. For the measurement of a large area surface, for example a span of ten feet or more, it may be advantageous to provide one or more optional adjustable beam supports disposed at intervals along the beam 110 between the left beam support 120 and the right beam support 125. The adjustable beam supports are attached at one end to the beam 110 and are adjustable to just provide contact with the surface 105 so as to provide enhanced flex resistance to the beam 110 during traverse of the sensor assembly 130.

The bearing track 170, also depicted in cross-section as 370 in FIG. 3, is supported by and preferably attached to the beam 110 (shown as 310 in FIG. 3). The sensor assembly 130 (shown as 330 in FIG. 3) is slidably attached to the bearing track 170 by means of the bearing 160 (shown as 360 in FIG. 3), allowing the sensor assembly 130 to be moved to any position along the length of the beam 110. The cross-sectional geometry of the bearing 160 is the inverse of the cross-sectional geometry of the bearing track 170. The more precisely the bearing geometry matches the bearing track geometry, the less random movement of the bearing against the bearing track and therefore the more precise the measurements attainable by the profilometer.

It is desirable that the bearing 160 and the bearing track 170 be constructed of the same materials. Materials suitable for construction of the bearing track 170 and bearing 160 include metals, plastics, and the like. Metals can include, but are not limited to, aluminum, steel, iron, copper and brass and nickel. Typically, both the bearing and the bearing track of constructed of aluminum. Suitable plastics can include engineering materials such as nylon, polyolefins, and polyester. As with the beam 110, the bearing track 170 is typically machined or otherwise formed in one piece along its length. One-piece bearing track construction provides smooth transit to the sensor assembly 130 as it traverses along the bearing track thereby providing maximum precision to the data output by the sensor 130.

One or more optional sensor supports depicted as 150A and 150B in FIGS. 1 and 1A (and 350A and 350B in FIG. 3) may be used to permit the sensor assembly 130 to be mounted on the bearing 160 in an advantageous position. For example, the sensor assembly 130 is shown in FIG. 1 positioned perpendicular to the beam 110 by means of sensor supports 150A and 150B. In this position, the cable 135 (depicted as 235 in FIG. 2) can be conveniently attached to sensor support 150B by means of the cable attachment depicted as 247 in FIG. 2. In another embodiment, the sensor assembly 130 can be positioned parallel to the beam 110 by mounting the sensor assembly 130 directly onto the sensor mount 150A. The sensor assembly 130 can also be mounted directly on the bearing 160.

Referring now to FIGS. 1 and 1A, an emitter (not shown) in sensor assembly 130 emits a beam of energy 132, which reflects from surface 105 towards a receiver (not shown) in the sensor assembly 130 along path 134. The sensor assembly 130 transmits the received information via the sensor output port 185 to a data acquisition device, such as, for example, a laptop computer. Signal processing converts the received information into, for example, vertical position information. At the same time, the position transducer 140 transmits via the transducer output port 180 (shown as 380 in FIG. 3) information related to the lateral position of the sensor assembly 130 along the bearing track 170. Transmission of data from either output port can be by a wired connection between the port and the data acquisition device. Transmission of data can also be by other means such as radio frequency, infrared frequency communication, or another form of wireless communication.

A typical sensor assembly 130 is a laser triangulation sensor such as that sold by Micro-Epsilon, Raleigh, NC under the tradename "optoNCDT 1400" Model Number ILD 1400-50. The choice of sensor can be determined by one of ordinary skill in the art and will be dictated, in part, by the desired resolution of the measurement and the distance of the sensor assembly from the surface to be measured. Generally some form of non-contact sensor is used. Suitable sensor options include, but are not limited to, ultrasonic time of flight, laser time of flight, and, for close up measurements of small changes, capacitive or inductive (including eddy current) displacement sensors.

Referring again to FIG. 1, the lateral position of the sensor assembly 130 as it traverses along the bearing track 170 is determined by the position transducer assembly 140. In the embodiment shown, the position transducer assembly 140 comprises a spring-loaded cable housed within the position transducer assembly 140. The cable 135 is attached at one end within the position transducer assembly, passes through the cable aperture 145 in the left beam support 120, and attaches at the other end to the sensor support 150B by means of the cable attachment 247 (see FIG. 2). In one embodiment, the position transducer assembly 140 can be a cable device such as that sold by Celesco Transducer Products, Chatsworth, CA under the tradename "PT5DC Cable Extension Position Transducer." The cable 135 is maintained under tension within the position transducer assembly 140. It is also contemplated that any measurement system that permits determination of lateral position of the sensor assembly along the beam would be suitable for use as a position transducer. Examples of other suitable measurement systems include laser sensors, ultrasound sensors, linear resisive devices, and optical or magnetic encoders.

Carriage knob 190 in FIG. 1 (and 390 in FIG. 3) permits the user of the profilometer 100 to translate manually the sensor assembly 130 laterally along the bearing track 170. In one embodiment of the inventive profilometer, the position transducer assembly 140 in FIG. 1 (depicted as 340 in FIG. 3) comprises means to maintain tension on cable 135 so as to urge attached sensor assembly 130 towards a home or starting position adjacent left beam support 120 (depicted as 320 in FIG. 3).

Translation of sensor assembly 130 laterally along the bearing track 170 could also be carried out mechanically. As an example, a second cable connected at one end to motorized wind/unwind means and at the other end to the sensor assembly could pull the sensor assembly towards the right beam support 125. Alternatively, a lead screw interfacing with the sensor assembly and driven by a servo motor could cause the sensor assembly 130 to translate along the bearing track 170.

The device of the present invention can be used to measure the profile of a number of different types of surfaces, including countertops, walls, floors, ceilings, structured materials such as abrasives, steel plates, micro-structured surfaces and the like. For example, the profilometer can be used to determine the relative planarity of a countertop substrate prior to laminating the final covering to the surface. The profilometer can also be used to determine a wear characteristic of an abrasive surface to enable the user to know when the abrasive is no longer effective. In another example, a profilometer of the present invention having an elongated beam can be used to determine the overall profile of a large area floor such as found in warehouses, garages and the like.

The present invention has been described with reference to several embodiments thereof. The foregoing description of specific embodiments and examples has been provided to illustrate the invention, and is not intended to be limiting of the scope of the invention. It will be apparent to those skilled in the art that many changes can be made to the described embodiments without departing from the spirit and scope of the invention.

What is claimed is:

1. A device for measuring the profile of a surface, the device comprising:
   (a) a beam;
   (b) at least one beam support mounted on the beam;
   (c) a sensor assembly slidably connected to the beam and adapted for measuring distance to the surface; and
   (d) a transducer assembly adapted for measuring a position of said sensor assembly along said beam, wherein said transducer assembly is configured to generate a signal as a function of a length of a spring-loaded cable protruding therefrom, and wherein said spring-loaded cable is tensioned by said transducer assembly and fastened at its distal end so that said position of said sensor assembly may be determined from said signal.

2. The device of claim 1, wherein the sensor assembly comprises a laser triangulation sensor.

3. The device of claim 1, further comprising a leveling apparatus.

4. The device of claim 1, further comprising a motor for moving the sensory assembly along the beam.

5. The device of claim 1, further comprising a carriage knob for manually positioning the sensor assembly on the beam.

6. The device of claim 1, further comprising a data acquisition apparatus connected to the sensor assembly and the transducer assembly.

7. The device of claim 1, wherein the beam support has an adjustable length.

8. The device of claim 1, wherein the surface is a floor.

9. A method for measuring the profile of a surface, the method comprising the steps of:
   (a) placing a sensor assembly at a first position along a beam;
   (b) measuring the distance from the sensor assembly to the surface at the first position;
   (c) measuring the lateral position of the sensor assembly on the beam at the first position;
   (d) placing the sensory assembly at a second position along a beam;

(e) measuring the distance from the sensor assembly to the surface at the second position; and (f) measuring the lateral position of the sensor assembly on the beam at the second position, wherein said measuring steps (c) and (0 are conducted with a transducer assembly that generates a signal as a function of a length of a spring-loaded cable protruding therefrom, and wherein said spring-loaded cable is tensioned by said transducer assembly and fastened at its distal end so that said position of said sensor assembly may be determined from said signal.

10. The method of claim 9, further comprising the step of (g) transmitting measurement information to a data acquisition device.

11. The method of claim 10, further comprising the step of (h) creating a two dimensional profile of the surface.

* * * * *

UNITED STATES PATENT AND TRADEMARK OFFICE
CERTIFICATE OF CORRECTION

PATENT NO. : 7,322,229 B2  Page 1 of 1
APPLICATION NO. : 11/019493
DATED : January 29, 2008
INVENTOR(S) : Justin W. Wilhelm It is certified that error appears in the above-identified patent and that said Letters Patent is hereby corrected as shown below:

<u>Column 5</u>
Line 53, Delete "resisive" and insert -- resistive --, therefor.

<u>Column 7</u>
Line 5, In Claim 9, delete "(0" and insert -- (f) --, therefor.

Signed and Sealed this

Seventeenth Day of June, 2008

JON W. DUDAS
*Director of the United States Patent and Trademark Office*